US012755590B2

(12) United States Patent
Wang et al.

(10) Patent No.: US 12,755,590 B2
(45) Date of Patent: Oct. 6, 2026

(54) METHODS, SYSTEMS, AND DEVICES FOR AUTOMATIC OPENING AND CLOSING OF A GARAGE DOOR

(71) Applicant: Toyota Motor Engineering & Manufacturing North America, Inc., Plano, TX (US)

(72) Inventors: Timothy Wang, Ann Arbor, MI (US); Roger Akira Kyle, Aubrey, TX (US); Bryan Else Yamasaki, Aubrey, TX (US); Justin K. Shen, Canton, MI (US); Jackson Zhu, Ann Arbor, MI (US); Xiao Xu, Novi, MI (US); Michael R. Kushnerik, The Colony, TX (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 153 days.

(21) Appl. No.: 18/812,853

(22) Filed: Aug. 22, 2024

(65) Prior Publication Data

US 2026/0057719 A1 Feb. 26, 2026

(51) Int. Cl.
*G07C 9/00* (2020.01)
*E05F 15/668* (2015.01)

(52) U.S. Cl.
CPC ........ *G07C 9/00896* (2013.01); *E05F 15/668* (2015.01); *G07C 9/00182* (2013.01); *E05Y 2900/106* (2013.01); *G07C 2009/0019* (2013.01); *G07C 2009/00928* (2013.01)

(58) Field of Classification Search
CPC ........... G07C 9/00896; G07C 9/00182; G07C 2009/0019; G07C 2009/00928; E05F 15/668; E05F 15/73; E05F 2015/767; E05Y 2900/106
See application file for complete search history.

(56) References Cited

U.S. PATENT DOCUMENTS

| | | | |
|---|---|---|---|
| 9,836,905 | B2 | 12/2017 | Chutorash et al. |
| 9,970,229 | B1 | 5/2018 | Favila et al. |
| 10,008,058 | B2 | 6/2018 | Piche et al. |
| 10,358,859 | B2 | 7/2019 | Lickfelt et al. |
| 10,837,216 | B2 | 11/2020 | Cheng et al. |

(Continued)

*Primary Examiner* — Davetta W Goins
(74) *Attorney, Agent, or Firm* — Snell & Wilmer LLP

(57) ABSTRACT

Methods, systems, and devices for an automatic garage door system for a vehicle. The system may include one or more occupant sensors configured to detect or determine occupant data indicating a number of occupants within the vehicle. The system may further include one or more cameras configured to capture video data of a surrounding area of the vehicle. The system may further include an electronic control unit (ECU) configured to receive the occupant data from the one or more occupant sensors and the video data from the one or more cameras. The ECU may be further configured to determine whether each of the number of occupants have entered a garage based on the received video data. The ECU may be further configured to transmit, via a network access device, one or more signals to a garage door transceiver of the garage to close a garage door of the garage.

20 Claims, 5 Drawing Sheets

(56) References Cited

U.S. PATENT DOCUMENTS

| | | | | |
|---|---|---|---|---|
| 10,846,960 | B1 * | 11/2020 | Lemberger | G06V 20/63 |
| 11,072,963 | B2 * | 7/2021 | Herman | B60L 58/24 |
| 11,120,655 | B1 * | 9/2021 | Huggins | E05F 15/73 |
| 11,338,645 | B2 * | 5/2022 | Chang | B60N 2/0029 |
| 11,727,736 | B2 | 8/2023 | Huggins et al. | |
| 2014/0118111 | A1 | 5/2014 | Saladin et al. | |
| 2016/0057574 | A1 | 2/2016 | Park | |
| 2018/0151006 | A1 | 5/2018 | Huggins et al. | |
| 2023/0406158 | A1 | 12/2023 | Roberts et al. | |

* cited by examiner

METHODS, SYSTEMS, AND DEVICES FOR AUTOMATIC OPENING AND CLOSING OF A GARAGE DOOR

BACKGROUND

1. Field

The present disclosure relates to methods, systems, and/or devices for automatic opening and closing of a garage door.

2. Description of the Related Art

Certain vehicles may enable users (e.g., a driver and/or a passenger) to manually open or close a garage door of a garage by, for example, pressing a button within the vehicle. The button in the vehicle is generally programmed using a remote garage door opener. In response to the button being pressed, the vehicle may transmit signals to a garage door transceiver inside the garage to open or close the garage door. However, if the user parks the vehicle outside, the garage door can be opened prior to the user exiting the vehicle but the garage door cannot be closed once the user exits the vehicle. Thus, the user must go to the main button inside the garage to close the garage door.

Accordingly, it is desirable to provide methods, systems, and devices for automatic opening and closing of a garage door.

SUMMARY

In general, one aspect of the subject matter described in this disclosure may be embodied in an automatic garage door system for a vehicle. The automatic garage door system may include one or more occupant sensors. The one or more occupant sensors may be configured to detect or determine occupant data indicating a number of occupants within the vehicle. The automatic garage door system may further include one or more cameras. The one or more cameras may be configured to capture video data of a surrounding area of the vehicle. The surrounding area may include a garage having a garage door and a garage door transceiver. The automatic garage door system may further include a network access device. The network access device may be configured to communicate with the garage door transceiver to open and close the garage door. The automatic garage door system may further include an electronic control unit (ECU) electrically connected to the one or more occupant sensors, the one or more cameras, and the network access device. The ECU may be configured to receive the occupant data from the one or more occupant sensors and the video data from the one or more cameras. The ECU may be further configured to determine whether each of the number of occupants have entered the garage based on the received video data. The ECU may be further configured to transmit, via the network access device, one or more signals to the garage door transceiver to close the garage door.

In one aspect, the subject matter may be embodied in an automatic garage door system for a vehicle. The automatic garage door system may include one or more occupant sensors. The one or more occupant sensors may be configured to detect or determine occupant data indicating a number of occupants within the vehicle. The automatic garage door system may further include one or more cameras. The one or more cameras may be configured to capture video data of a surrounding area of the vehicle. The surrounding area may include a door of a house and a garage having a garage door and a garage door transceiver. The automatic garage door system may further include a network access device configured to communicate with the garage door transceiver to open and close the garage door. The automatic garage door system may further include an electronic control unit (ECU) electrically connected to the one or more occupant sensors, the one or more cameras, and the network access device. The ECU may be configured to receive the occupant data from the one or more occupant sensors and the video data from the one or more cameras. The ECU may be further configured to determine whether each of the number of occupants have entered the garage through the garage door and/or the house through the door based on the received video data. The ECU may be further configured to transmit, via the network access device, one or more signals to the garage door transceiver to close the garage door.

In one aspect, the subject matter may be embodied in a method for automatically controlling a garage door of a garage having a garage door transceiver. The method may include detecting or determining, via one or more occupant sensors, occupant data indicating a number of occupants within a vehicle. The method may further include capturing, via one or more cameras, video data of a surrounding area of the vehicle. The surrounding area may include the garage. The method may further include determining, via an electronic control device (ECU) electrically connected to the one or more occupant sensors and the one or more cameras, whether each of the number of occupants have entered the garage based on the video data. The method may further include transmitting, via a network access device electrically connected to the ECU, one or more signals to the garage door transceiver to close the garage door.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Disclosed herein are methods, systems, devices, and/or vehicles for implementing a garage door system. Particular embodiments of the subject matter described in this disclosure may be implemented to realize one or more of the following advantages. The garage door system may automatically open a garage door of a garage when a vehicle approaches and/or is parked outside of the garage. The garage door system may determine (e.g., via one or more occupant sensors) how many occupants are within the vehicle before and/or when the vehicle is parked. The garage door system may track movement of the one or more occupants (e.g., via one or more cameras) when the one or more occupants exit the vehicle. The garage door system may automatically close the garage door when the garage door system determines that all of the occupants have entered the garage and/or are a predetermined distance from the garage door (e.g., 5 feet away from the garage door in its closed position and inside the garage). That is, the garage door system also provides enhanced safety by determining when the occupants exiting the vehicle are within the garage and a predetermined distance inside the garage.

Moreover, the garage door system may wait a predetermined amount of time after determining that all of the occupants have entered the garage before closing the garage door. In addition or alternatively, the garage door system may close the garage door after determining that all of the occupants have entered the garage and all of the occupants are at least a predetermined distance from a threshold of the garage. This improves the safety of the garage door system. This ensures that the occupants are not in the line of or close to the garage door.

Figure 1:
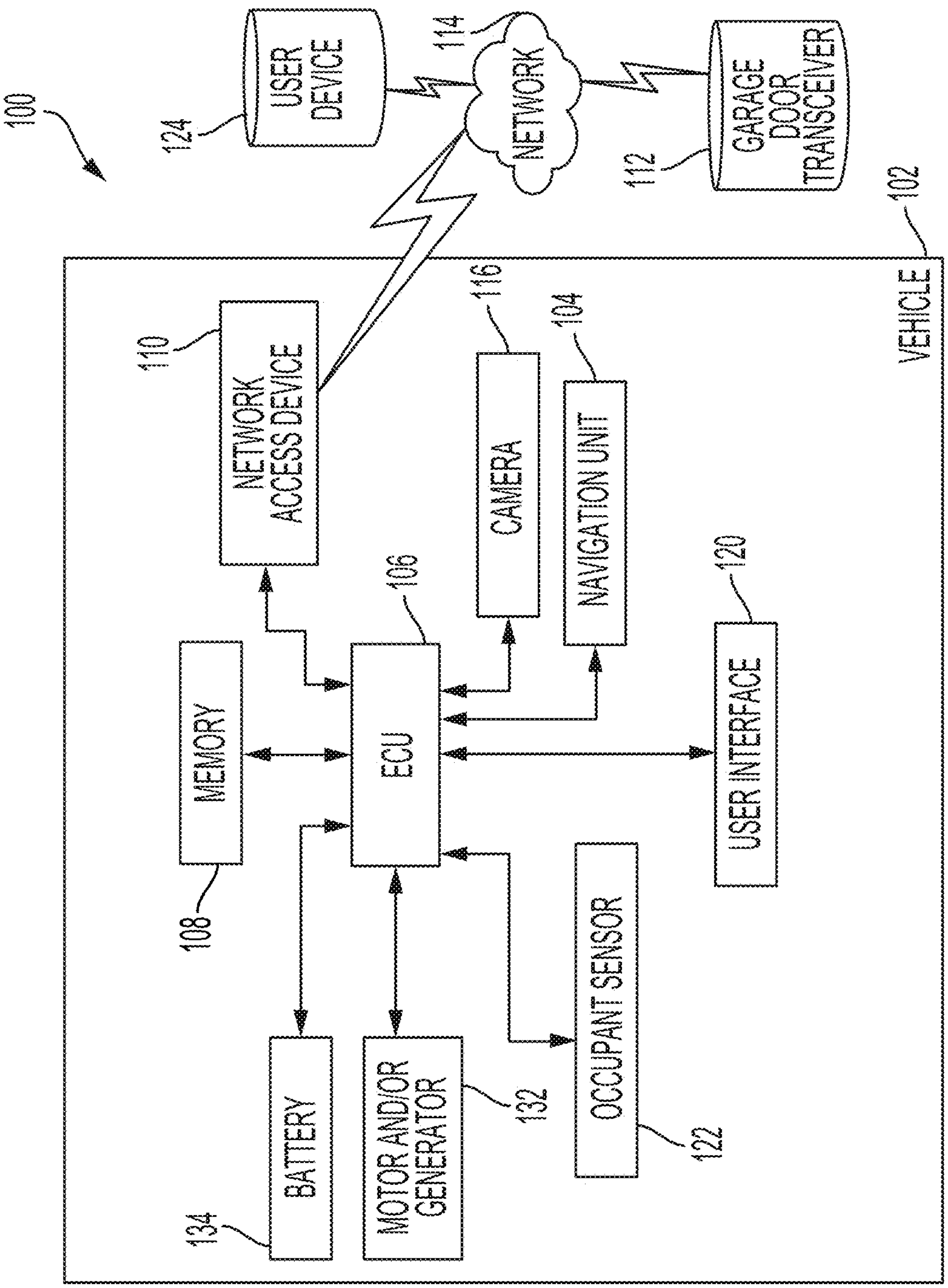
FIG. 1 is a block diagram of an example garage door system for a vehicle according to an aspect of the disclosure.

FIG. 1 is a block diagram of an example garage door system 100 (also may be referred to as an automatic garage door system 100). The garage door system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The vehicle 102 may include a motor and/or generator 132 and/or a battery 134. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102 and/or the garage door system 100. Accordingly, the motor and/or generator 132 can cause the vehicle 102 to accelerate, decelerate, or maintain a desired velocity. The motor and/or generator 132 may include combinations of an ICE and an electric motor, such as for hybrid electric vehicle (HEV) applications, for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the garage door system 100.

The garage door system 100 and/or the vehicle 102 may further include one or more processors, such as an electronic control unit (ECU) 106. The ECU 106 may be implemented as a single ECU or in multiple ECUs. The ECU 106 may be electrically connected to some or all of the components of the vehicle 102 and/or the garage door system 100 (e.g., via a controller area network (CAN) bus and/or other protocols). The ECU 106 may include one or more processors (or controllers) specifically designed for controlling operations of the vehicle 102, such as accelerating, braking, controlling a panoramic view monitor (PVM) system of the vehicle 102 (e.g., one or more cameras 116), etc. In examples, the ECU 106 may be and/or include an advanced driver assistance systems (ADAS) sensor fusion ECU, a panoramic view monitor (PVM) ECU, an engine control module (ECM), a transmission control module (TCM), a telematics control unit (TCU), an in-vehicle infotainment (IVI) ECU, and/or a graphics processing unit (GPU).

The garage door system 100 and/or the vehicle 102 may further include a memory 108. The memory 108 may be electrically connected to the ECU 106. In examples, the memory 108 may be communicatively coupled (e.g., via a network 114) to the ECU 106 such that the memory 108 is remote from the ECU 106 and/or the vehicle 102. In other examples, the memory 108 may be electrically connected to the ECU 106 and a remote memory (e.g., a remote database) may be communicatively coupled to the ECU 106, with the remote memory having similar, additional, and/or different functions as the memory 108 (e.g., greater storage capacity, enabling over-the-air updates, etc.). The memory 108 may store instructions to execute on the ECU 106 and may include one or more of a random access memory (RAM) or other volatile or non-volatile memory. The memory 108 may be a non-transitory memory or a data storage device, such as a hard disk drive, a solid-state disk drive, a hybrid disk drive, or other appropriate data storage, and may further store machine-readable instructions, which may be loaded and executed by the ECU 106.

The garage door system 100 and/or the vehicle 102 may further include a user interface 120. The user interface 120 may be located within a cabin 302 (marked in FIG. 3) of the vehicle 102 and/or may be coupled to a dashboard 304 (marked in FIG. 3) of the vehicle 102. The user interface 120 may provide an interface to a user (e.g., a driver and/or a passenger) of the vehicle 102 to interact with and/or receive output from the ECU 106. The user interface 120 may have a user interface element, such as one or more screens and/or one or more touchscreens with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106.

The garage door system 100 and/or the vehicle 102 may further include a navigation unit 104. The navigation unit 104 may be electrically connected to the ECU 106. The navigation unit 104 may provide vehicle information (or data) and/or navigational map information to the ECU 106. The navigation unit 104 may have and/or be connected to a Global Positioning System (GPS) device. The vehicle information may include a current speed, position, location, and/or orientation of the vehicle 102, and/or a direction of travel of the vehicle 102. In examples, the navigation unit 104 may determine, detect, and/or indicate when the vehicle 102 is within a first predetermined distance (e.g., 10 feet, 50 feet, between 5 and 300 feet, etc.) of one or more locations and/or when the vehicle 102 drives more than the first predetermined distance away from the one or more locations. For example, the one or more locations may include one or more homes and/or one or more garages of the user. In examples, the user interface 120 may receive user input data from the user indicating and/or selecting the first predetermined distance and/or the one or more locations (e.g., by selecting and/or inputting one or more addresses). In examples, the first predetermined distance may be set by a manufacturer of the vehicle 102. The first predetermined distance and/or the one or more locations may be stored in the memory 108.

The garage door system 100 and/or the vehicle 102 may further include a network access device 110. The network access device 110 may be electrically connected to the ECU 106 and may include a communication port or channel, such as one or more of a Wi-Fi unit, a Bluetooth® unit, a Radio Frequency Identification (RFID) tag or reader, a DSRC unit, and/or a cellular network unit for accessing the network 114 (e.g., CDMA, GSM, 3G, 4G, 5G, etc.). The network access device 110 may transmit data to and receive data from devices and systems not directly connected to the vehicle 102. For example, the network access device 110 may be and/or include a garage door opener configured to communicate with a garage door transceiver 112 directly (e.g., via radio frequency (RF) signals, infrared (IR) signals, etc.) and/or via the network 114. The network access device 110 may be configured to communicate with a user device 124 (e.g., a phone, a tablet, a laptop, a computer, etc.) via the network 114. In examples, the user device 124 may have some or all of the features of the user interface 120 (e.g., providing input and/or output of information (or data) to and/or from the ECU 106, such as the user input data).

Figure 2:
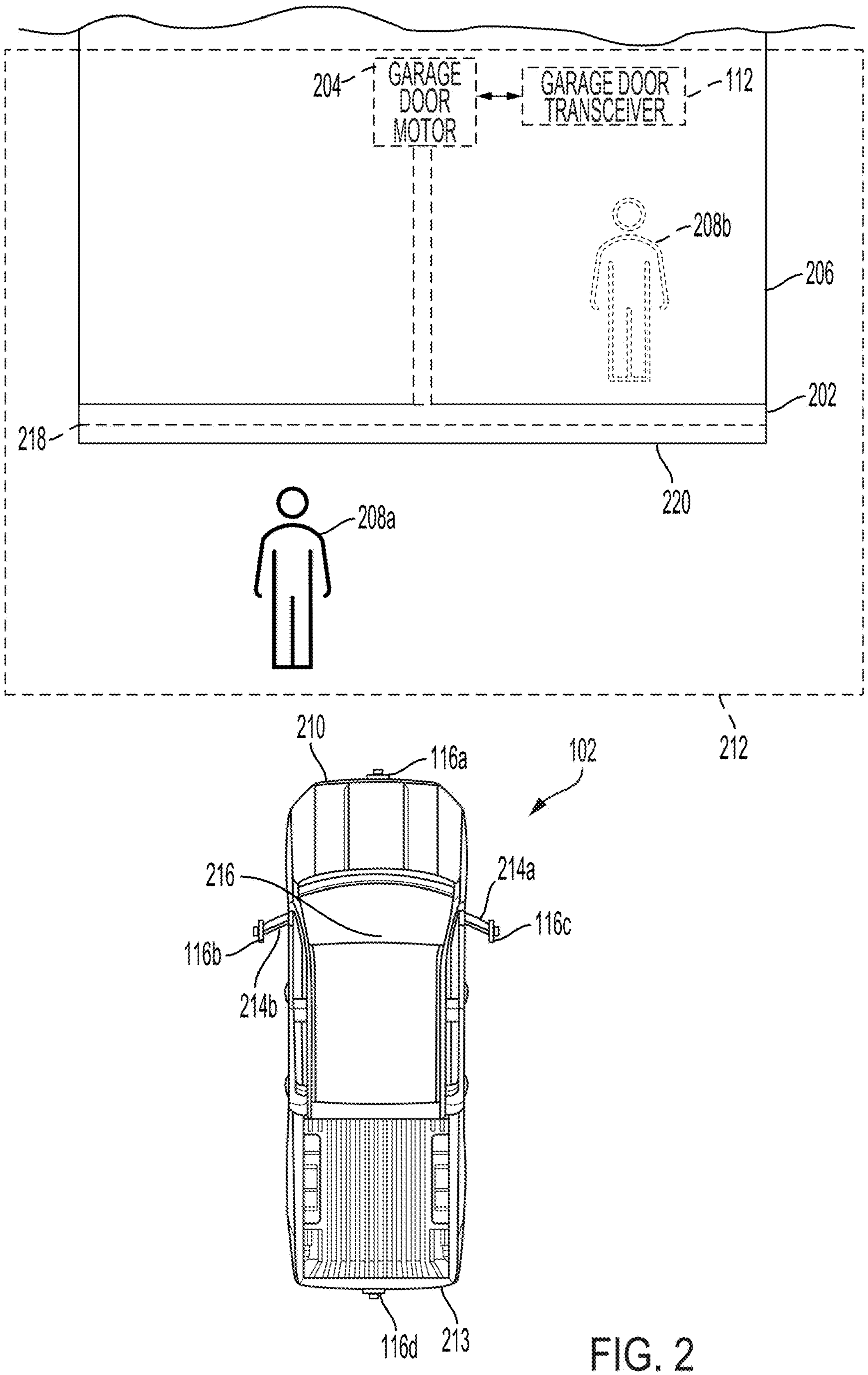
FIG. 2 illustrates a top view of an example garage and an example vehicle including the example garage door system of FIG. 1 according to an aspect of the disclosure.

FIG. 2 illustrates a top view of an example garage 206 and an example vehicle 102 including the garage door system 100 of FIG. 1. With combined reference to FIGS. 1 and 2, the network access device 110 may be configured to transmit one or more signals (e.g., an open signal and/or a close signal) to open and/or close a garage door 202 of the garage 206. The garage door 202 may define and/or be positioned along a vertical plane 218 when the garage door 202 is closed. In examples, the garage door 202 may define and/or be positioned along a horizontal plane when the garage door 202 is open. The garage door 202 may be coupled to a garage door motor 204 configured to open and close the garage door 202. The garage door motor 204 may include and/or be electrically connected to the garage door transceiver 112. The garage door motor 204 may be configured to open and/or close the garage door 202 in response to the garage door transceiver 112 receiving the one or more signals from the network access device 110.

For example, the ECU 106 may control the network access device 110 to transmit the one or more signals to the garage door transceiver 112 to open or close the garage door 202. The ECU 106 may control the network access device 110 to transmit the one or more signals to the garage door transceiver 112 in response to the ECU 106 receiving user input (or user input data) from the user interface 120 and/or the user device 124. The user input may indicate a desire of the user to open or close the garage door 202. In examples, the ECU 106 may control the network access device 110 to transmit the one or more signals to the garage door transceiver 112 in response to the ECU 106 receiving the indication from the navigation unit 104 when the vehicle 102 is within the first predetermined distance from the one or more locations (e.g., a location of the garage 206). For example, as the vehicle 102 approaches the garage 206 and comes within the first predetermined distance of the garage 206, the ECU 106 may control the network access device 110 to transmit the one or more signals to the garage door transceiver 112 to open the garage door 202.

In examples, the ECU 106 may control the network access device 110 to transmit the one or more signals to the garage door transceiver 112 to close the garage door 202 when one or more occupants (e.g., a driver and/or a passenger of the vehicle 102) have exited the vehicle 102 and entered into the garage 206. The one or more occupants may have been within the vehicle 102 as the vehicle 102 approached the garage 206 and parked.

The garage door transceiver 112 may also receive one or more signals from an application on a mobile device (e.g., a cell phone). For example, when a user's mobile device determines that the user (and all other occupants) are safely in the garage or house using a proximity sensor, for example, the application can automatically active and trigger an open signal or a close signal of the mobile device to automatically open or close the garage door.

Figure 3:
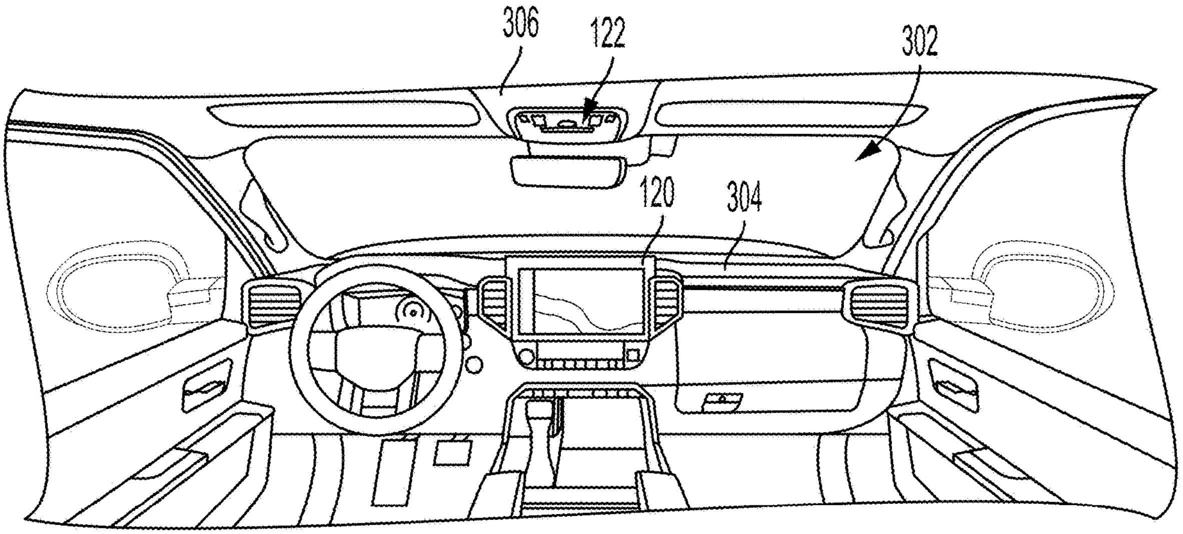
FIG. 3 illustrates a perspective view of a cabin of an example vehicle including the example garage door system of FIG. 1 according to an aspect of the disclosure.

FIG. 3 is an illustration of the cabin 302 of the vehicle 102. Referring to FIG. 3 with continuing reference to FIGS. 1 and 2, the garage door system 100 and/or the vehicle 102 may further include one or more occupant sensors 122. The one or more occupant sensors 122 may be electrically connected to the ECU 106. The one or more occupant sensors 122 may be and/or include one or more cameras, one or more radar sensors, one or more lidar sensors, one or more sonar sensors, one or more weight (or pressure) sensors, and/or one or more seatbelt sensors. In examples, the one or more occupant sensors 122 may be and/or include a cabin awareness system (CAS). The one or more occupant sensors 122 may be coupled to a ceiling 306 of the cabin 302 as shown in FIG. 3. However, in examples, in addition to and/or as an alternative to the ceiling 306, the one or more occupant sensors 122 may be coupled to the dashboard 304 of the vehicle 102 and/or to one or more seats of the vehicle (e.g., when the one or more occupant sensors 122 include the one or more weight sensors and/or the one or more seatbelt sensors).

The one or more occupant sensors 122 may be configured to detect and/or determine occupant data. The occupant data may indicate and/or include a number (or quantity) of occupants (e.g., one, two, etc.) that are within the vehicle 102 (e.g., the number of occupants that are within the vehicle 102 before the vehicle 102 is parked and the number of occupants exit the vehicle 102). To detect and/or determine the occupant data, the one or more occupant sensors 122 may be configured to detect and/or determine whether an occupant is within each respective seat of the vehicle 102. In examples, the one or more occupant sensors 122 may detect image, radar, lidar, and/or sonar data to detect and/or determine whether an occupant is within each respective seat of the vehicle 102. In examples, the one or more occupant sensors 122 may provide the detected image, radar, lidar, and/or sonar data to the ECU 106 and the ECU 106 may determine the occupant data based on the received detected image, radar, lidar, and/or sonar data.

For example, the one or more occupant sensors 122 may detect and/or determine that an occupant is within a respective seat of the vehicle 102 when a predetermined weight (e.g., more than or equal to 20 pounds, 30 pounds, etc.) is detected and/or measured on the respective seat, when a seatbelt of the respective seat is buckled and/or unbuckled, and/or when the detected image, radar, lidar, and/or sonar data indicates that an occupant is within the respective seat. In examples, the predetermined weight may be stored in the memory 108 and/or may be selected by the user (e.g., via the user interface 120 and/or the user device 124). The one or more occupant sensors 122 and/or the ECU 106 may utilize the detected image, radar, lidar, and/or sonar data in computer vision algorithms and/or distance calculations to detect and/or determine that an occupant is within a respective seat of the vehicle 102.

Returning to FIG. 2 with continuing reference to FIGS. 1 and 3, the garage door system 100 and/or the vehicle 102 may further include one or more cameras (or object sensors) 116. The one or more cameras 116 may be electrically connected to the ECU 106. The one or more cameras 116 may be coupled to a windshield 216 of the vehicle 102 and/or an exterior of the vehicle 102 (e.g., a front bumper 210, a rear bumper 213, side view mirrors 214*a* and 214*b*, side panels, etc.). The one or more cameras 116 may be and/or include one or more of a digital camera, an infrared thermal camera, and/or a night vision camera (e.g., utilizing active illumination and/or image intensification). The one or more cameras 116 may provide, capture, and/or record video data (or image data) including images and/or real-time video of a surrounding area 212 of the vehicle 102. The surrounding area 212 may include the garage 206, a driveway in front of the garage 206, and/or areas adjacent to and/or near (e.g., less than 5 feet, 10 feet, etc.) the garage 206. The one or more cameras 116 may provide the video data to the ECU 106.

In examples, the ECU 106 may be configured to determine whether the vehicle 102 is parked outside of the garage 206 based on the received video data. For example, the ECU 106 may use computer vision algorithms to process and/or analyze the video data to determine whether the vehicle 102 is parked outside of the garage 206. In examples, when the ECU 106 determines that the vehicle 102 is parked inside of the garage 206, the ECU 106 may deactivate (or turn off) the garage door system 100 and/or the vehicle 102.

In examples, the one or more cameras 116 may be and/or include a panoramic view monitor (PVM) system. For example, the one or more cameras 116 may include a front camera 116*a* coupled to the front bumper 210 (or the windshield 216), a left side camera 116*b* coupled to a left side view mirror 214*b*, a right side camera 116*c* coupled to a right side view mirror 214*a*, and/or a rear camera 116*d* coupled to the rear bumper 213 (or tailgate) of the vehicle 102 (in examples, the one or more cameras 116 may include less than four cameras or more than four cameras and/or may be coupled to different components of the vehicle 102).

In examples, when the vehicle 102 is parked, the ECU 106 may determine an orientation of the vehicle 102 with respect to the garage 206 based on orientation data received from the navigation unit 104 and/or by analyzing the video data received from the one or more cameras 116. Based on the orientation of the vehicle 102 with respect to the garage 206, the ECU 106 may control one or more of the front camera 116*a*, the left side camera 116*b*, the right side camera 116*c*, and/or the rear camera 116*d* to capture video data of the surrounding area 212.

In examples, the ECU 106 may determine whether the garage door 202 is open based on the video data received from the one or more cameras 116. The ECU 106 may use computer vision algorithms to process and/or analyze the video data to determine whether the garage door 202 is open. In examples, when the vehicle 102 is parked and/or is approaching the garage door 202 and the ECU 106 determines that the garage door 202 is closed based on the received video data, the ECU 106 may control the network access device 110 to transmit the one or more signals to the garage door transceiver 112 to open the garage door 202.

When the vehicle 102 is parked and the garage door 202 is open, the ECU 106 may determine whether each of the number of occupants indicated by and/or included in the occupant data received from the one or more occupant sensors 122 have entered the garage 206 based on the video data received from the one or more cameras 116. In examples, the ECU 106 may determine whether each of the number of occupants have entered the garage 206 based on the received video data in response to the determination that the vehicle 102 is parked outside of the garage 206. When the ECU 106 determines that each of the number of occupants have entered the garage 206, the ECU 106 may control the network access device 110 to transmit the one or more signals to the garage door transceiver 112 to close the garage door 202. This enables the number of occupants to enter the garage 206 without having to worry about closing the garage door 202. Moreover, by waiting until each of the number of occupants have entered the garage 206 before closing the garage door 202, the garage door system 100 has the benefit, for example, of ensuring that no occupant of the vehicle 102 is left behind.

For example, the one or more occupant sensors 122 may detect and/or determine occupant data indicating that two occupants are within the vehicle 102. The two occupants may include, for example, a first occupant 208*a* and a second occupant 208*b* (in examples, only one occupant or more than two occupants may be detected within the vehicle 102). In FIG. 2, although two occupants 208*a* and 208*b* are illustrated, the garage door system 100 may function with any number of occupants.

The ECU 106 may receive the video data from the one or more cameras 116. In examples, the ECU 106 may determine the orientation of the vehicle 102 with respect to the garage 206 and control the one or more cameras 116 based on the orientation of the vehicle 102. That is, the ECU 106 may receive video data from one or more respective cameras of the one or more cameras 116 that have the surrounding area 212 in a field of view of the one or more respective cameras 116.

The ECU 106 may determine whether the two occupants 208*a* and 208*b* have each entered the garage 206 based on the video data received from the one or more cameras 116. The ECU 106 may use computer vision algorithms (e.g., haar cascades, histogram of orientated gradients, etc.) to process and/or analyze the video data to track movement of the two occupants 208*a* and 208*b* as the two occupants 208*a* and 208*b* exit the vehicle 102. When the ECU 106 determines that each of the two occupants 208*a* and 208*b* have entered the garage 206, the ECU 106 may control the network access device 110 to transmit the one or more signals to the garage door transceiver 112 to close the garage door 202.

In FIG. 2, for example, the first occupant 208*a* is depicted outside of the garage 206 and the second occupant 208*b* is depicted inside the garage 206. Thus, in the example scenario depicted in FIG. 2, the ECU 106 may not yet control the network access device 110 to transmit the one or more signals to the garage door transceiver 112 to close the garage door 202. Instead, the ECU 106 may track the movement of the first occupant 208*a* by processing and/or analyzing the video data and may wait to transmit the one or more signals until the first occupant 208*a* enters the garage 206.

In examples, the ECU 106 may track the movement of occupants who have exited the vehicle 102 (e.g., the first occupant 208*a*) for a first predetermined amount of time (e.g., 1 minute, 5 minutes, etc.) and if the occupants have not entered the garage 206 within the first predetermined amount of time, the garage door system 100 and/or the vehicle 102 may deactivate (or turn off) and/or the ECU 106 may transmit (e.g., via the network access device 110) a message to the user device 124 indicating that the garage door 202 is open. In examples, the message may provide an option to close the garage door 202. The first predetermined amount of time may be counted from, for example, the moment the vehicle 102 is parked, locked, and/or when all occupants have exited the vehicle 102. The ECU 106 may be configured to determine when the vehicle 102 is parked, locked, and/or when all occupants have exited the vehicle 102 (e.g., via the one or more occupant sensors 122 and/or by determining that the vehicle 102 has been locked). In examples, the first predetermined amount of time may be counted from when the garage door 202 is opened. The first predetermined amount of time may be stored in the memory 108. In examples, the first predetermined amount of time may be selected and/or set by a user (e.g., a driver and/or a passenger of the vehicle 102) via the user interface 120 and/or the user device 124.

In examples, the ECU 106 may wait a second predetermined amount of time (e.g., 30 seconds, 1 minute, etc.) after all occupants indicated by and/or included in the received occupant data have entered the garage 206 to transmit the one or more signals to the garage door transceiver 112 to close the garage door 202. The second predetermined amount of time may be stored in the memory 108. In examples, the second predetermined amount of time may be selected and/or set by a user (e.g., a driver and/or a passenger of the vehicle 102) via the user interface 120 and/or the user device 124.

In examples, the ECU 106 may determine that all occupants indicated by and/or included in the received occupant data have entered the garage 206 and are at least a second predetermined distance (e.g., 3 feet, 5 feet, etc.) from a threshold 220 of the garage 206 (or from the vertical plane 218) before transmitting the one or more signals to the garage door transceiver 112 to close the garage door 202. The second predetermined distance may be stored in the memory 108. In examples, the second predetermined distance may be selected and/or set by a user (e.g., a driver and/or passenger of the vehicle 102) via the user interface 120 and/or the user device 124.

Figure 4:
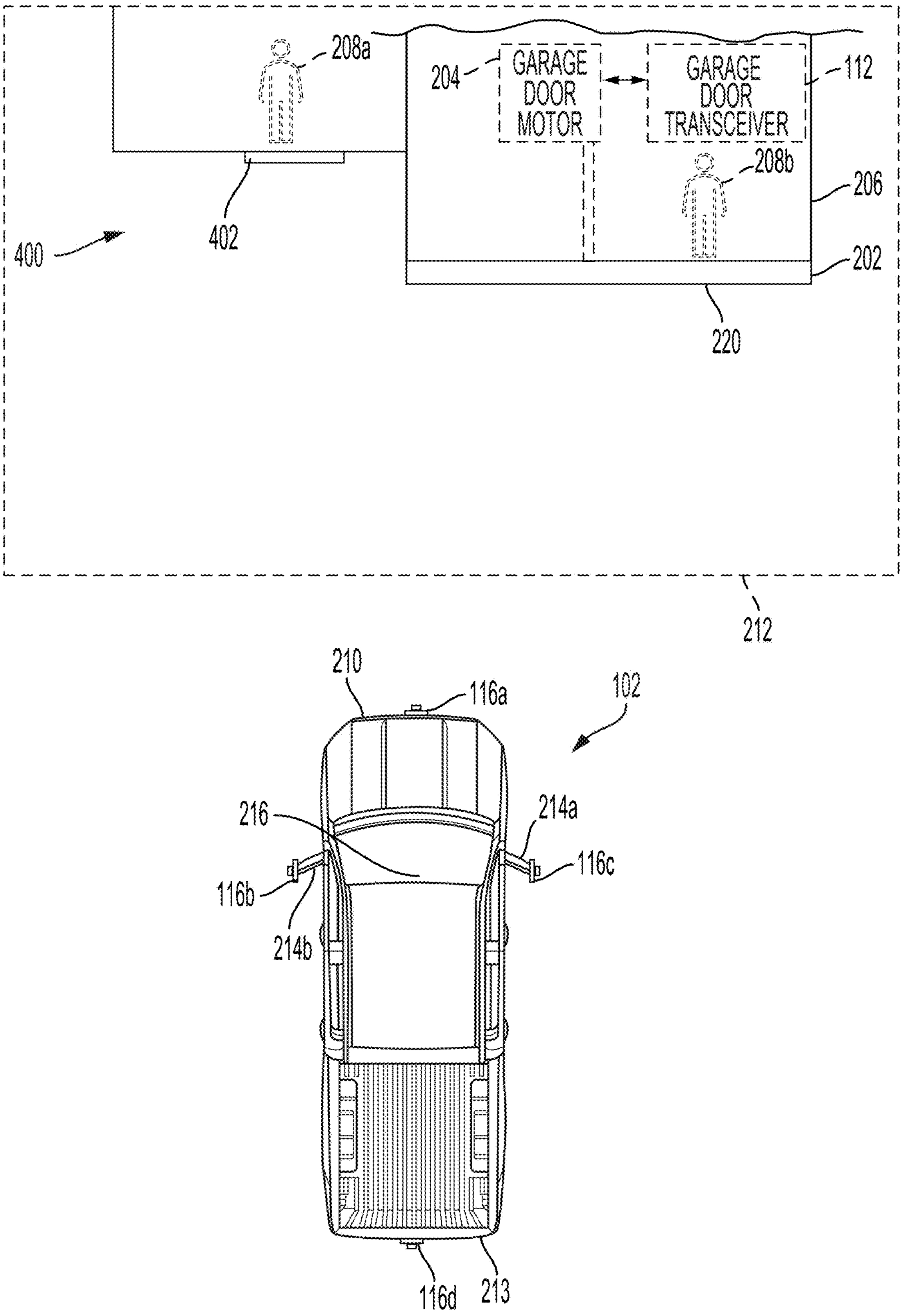
FIG. 4 illustrates a top view of an example house and an example vehicle including the example garage door system of FIG. 1 according to an aspect of the disclosure.

FIG. 4 is a top view of an example house 400 including the garage 206 and a door 402 (e.g., a front door, a side door, etc.). Referring to FIG. 4 with continuing reference to FIGS. 1-3, in examples, the ECU 106 may be configured to analyze and/or process the video data received from the one or more cameras 116 to determine whether all of the occupants indicated by and/or included in the occupant data received from the one or more occupant sensors 122 have entered the house 400 through the door 402 and/or the garage 206 through the garage door 202. For example, when the ECU 106 determines that the first occupant 208*a* has entered the house 400 through the door 402 and the second occupant 208*b* has entered the garage 206 through the garage door 202 and/or that all of the occupants 208*a* and 208*b* have entered the house 400 through the door 402, the ECU 106 may control the network access device 110 to transmit the one or more signals to the garage door transceiver 112 to close the garage door 202 (in examples, the ECU 106 may wait for the second predetermined amount of time before controlling the network access device 110).

In examples, when the ECU 106 determines that the first occupant 208*a* has entered the house 400 through the door 402 and the second occupant 208*b* has entered the garage 206 and/or that some or all of the occupants 208*a* and 208*b* have entered the house 400 through the door 402, the ECU 106 may control the network access device 110 to transmit a message to the user device 124 indicating that the garage door 202 is open. The message may include an option to close the garage door 202.

In FIG. 4, although two occupants 208*a* and 208*b* are illustrated, the garage door system 100 may function with any number of occupants.

Figure 5:
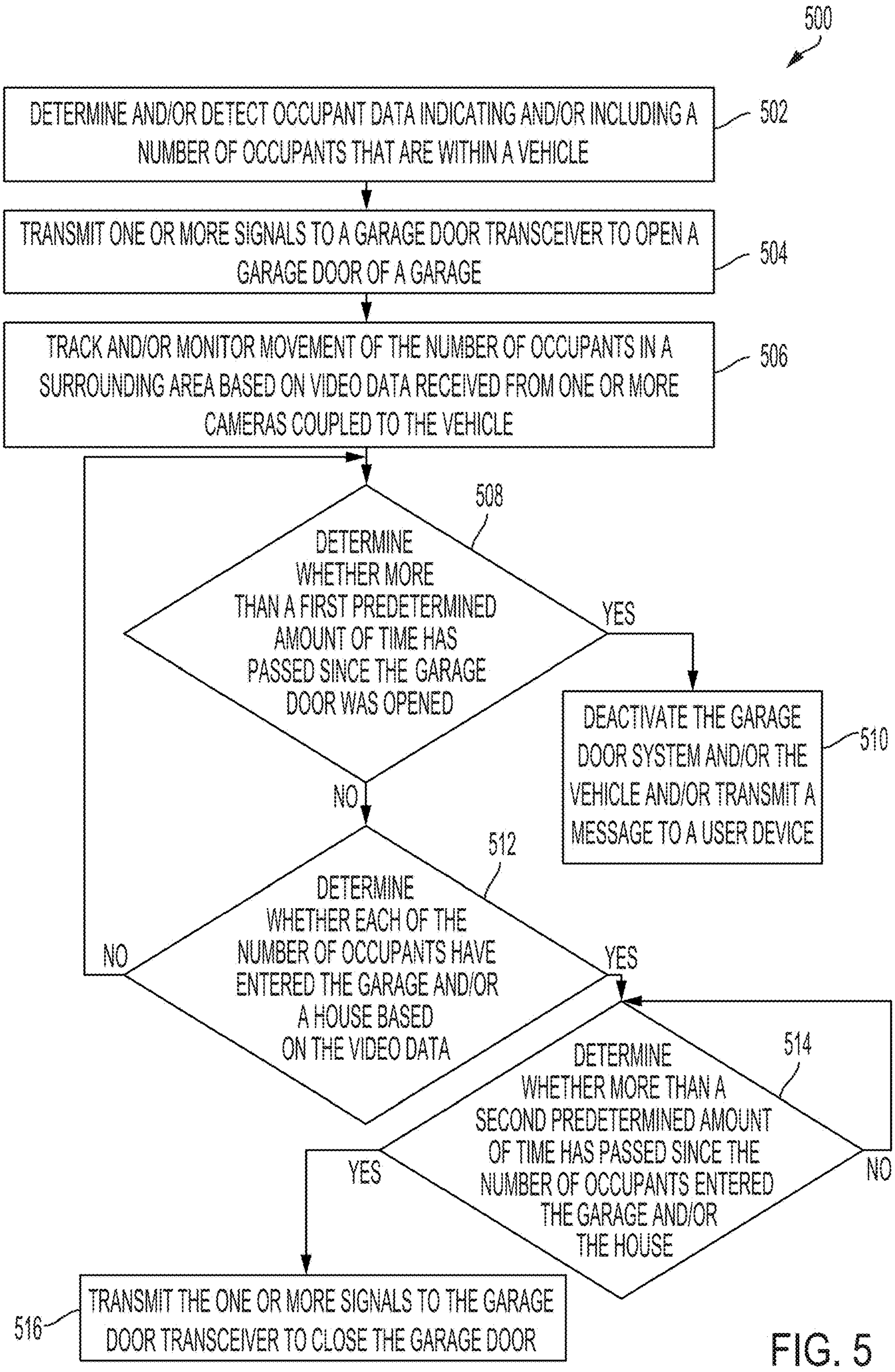
FIG. 5 is a flow diagram of an example process for controlling the example garage door system of FIG. 1 according to an aspect of the disclosure.

FIG. 5 is a flow diagram of an example process 500 for controlling the garage door system 100. One or more computers or one or more data processing apparatuses, for example, the ECU 106 of the garage door system 100 of FIG. 1, appropriately programmed, may implement the process 500. For ease of description, the process 500 is described below with reference to FIGS. 1-4. The process 500 of the present disclosure, however, is not limited to use of the exemplary garage door systems of FIGS. 1-4.

The garage door system 100 may determine and/or detect (e.g., via the one or more occupant sensors 122) occupant data indicating and/or including a number of occupants that are within the vehicle 102 (502). The garage door system 100 may determine and/or detect the occupant data when the vehicle 102 is parked and/or before the vehicle 102 is parked (i.e., the vehicle 102 is in motion).

The garage door system 100 may transmit (e.g., via the network access device 110) the one or more signals (e.g., an open signal) to the garage door transceiver 112 to open the garage door 202 (504). In examples, the garage door system 100 may transmit the one or more signals to the garage door transceiver 112 to open the garage door 202 in response to receiving an indication (e.g., from the navigation unit 104) that the vehicle 102 is within the first predetermined distance (e.g., 10 feet, 50 feet, between 5 and 300 feet, etc.) of the one or more locations (e.g., the house 400 and/or the garage 206) and/or determining that the garage door 202 is closed based on the video data received from the one or more cameras 116. In examples, the garage door system 100 may transmit the one or more signals to the garage door transceiver 112 to open the garage door 202 in response to receiving user input data (e.g., via the user interface 120 and/or the user device 124) indicating a command from a user (e.g., a driver and/or a passenger of the vehicle 102) to open the garage door 202.

The garage door system 100 may track and/or monitor the movement of the number of occupants in the surrounding area 212 of the vehicle 102 (e.g., when the number of occupants exit the vehicle 102) based on the video data received from the one or more cameras 116 coupled to the vehicle 102 (506). In examples, the garage door system 100 may track the movement of the number of occupants based on the video data received from the one or more cameras 116 in response to determining that the garage door 202 is open and/or determining that the vehicle 102 is parked outside of the garage 206. In examples, the garage door system 100 may determine the orientation of the vehicle 102 with respect to the garage 206 based on the orientation data received from the navigation unit 104 and/or by analyzing the video data received from the one or more cameras 116. Based on the orientation of the vehicle 102, the garage door system 100 may control one or more of the front camera

116*a*, the left side camera 116*b*, the right side camera 116*c*, and/or the rear camera 116*d* to capture the video data of the surrounding area 212.

The garage door system 100 may determine whether more than (or equal to) the first predetermined amount of time has passed since the garage door 202 was opened (or the vehicle 102 was parked or locked) (508).

When more than (or equal to) the first predetermined amount of time has passed since the garage door 202 was opened at block 508, the garage door system 100 and/or the vehicle 102 may deactivate (or turn off) and/or the garage door system 100 may transmit a message to the user device 124 (510). The message may indicate that the garage door 202 is open and may provide an option to close the garage door 202.

When less than the first predetermined amount of time has passed since the garage door 202 was opened at block 508, the garage door system 100 may determine whether each of the number of occupants have entered the garage 206 (e.g., through the garage door 202) and/or the house 400 (e.g., through the door 402) based on the video data (512). In examples, the garage door system 100 may determine whether each of the number of occupants have entered the garage 206 (e.g., through the garage door 202) and/or the house 400 (e.g., through the door 402) based on the video data in response to determining that the vehicle 102 is parked outside of the garage 206.

When the garage door system 100 determines that each of the number of occupants have entered the garage 206 and/or the house 400 at block 512, the garage door system 100 may determine whether more than (or equal to) the second predetermined amount of time has passed since the number of occupants entered the garage 206 and/or the house 400 (514). In examples, when the garage door system 100 determines that each of the number of occupants have entered the garage 206 and/or the house 400 at block 512, the garage door system 100 may determine whether each of the number of occupants are at least the second predetermined distance (e.g., 3 feet, 5 feet, etc.) from the threshold 220 of the garage 206 (or from the vertical plane 218).

When the garage door system 100 determines that more than (or equal to) the second predetermined amount of time has passed since the number of occupants entered the garage 206 and/or the house 400 at block 514 (and/or that each of the number of occupants are at least the second predetermined distance from the threshold 220 of the garage 206 (or from the vertical plane 218)), the garage door system 100 may control the network access device 110 to transmit the one or more signals (e.g., a close signal) to the garage door transceiver 112 to close the garage door 202 (516).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An automatic garage door system for a vehicle, the system comprising:

one or more occupant sensors configured to detect or determine occupant data indicating a number of occupants within the vehicle;

one or more cameras configured to capture video data of a surrounding area of the vehicle, the surrounding area including a garage having a garage door and a garage door transceiver;

a network access device configured to communicate with the garage door transceiver to open and close the garage door; and an electronic control unit (ECU) electrically connected to the one or more occupant sensors, the one or more cameras, and the network access device and configured to:

receive the occupant data from the one or more occupant sensors and the video data from the one or more cameras;

track movement of each of the number of occupants in the surrounding area of the vehicle after the number of occupants exit the vehicle by processing or analyzing the received video data;

determine, based on the tracked movement, whether each of the number of occupants indicated by the occupant data have entered the garage; and transmit, via the network access device, one or more signals to the garage door transceiver to close the garage door in response to a determination that all of the number of occupants indicated by the occupant data have entered the garage.

2. The system of claim 1, wherein the ECU is further configured to:

determine whether the vehicle is parked outside of the garage based on the received video data; and wherein the ECU is configured to determine whether each of the number of occupants have entered the garage based on the received video data in response to the determination that the vehicle is parked outside of the garage.

3. The system of claim 1, wherein the ECU is configured to transmit the one or more signals to the garage door transceiver to close the garage door in response to:

the determination that each of the number of occupants have entered the garage; and determining that more than or equal to a predetermined amount of time has passed since each of the number of occupants have entered the garage and/or that each of the number of occupants are at least a predetermined distance from a threshold of the garage.

4. The system of claim 1, further comprising:

a navigation unit in communication with the ECU and configured to indicate when the vehicle is within a predetermined distance of the garage; and wherein the ECU is further configured to transmit, via the network access device, the one or more signals to the garage door transceiver to open the garage door in response to receiving the indication from the navigation unit.

5. The system of claim 4, wherein the ECU is further configured to:

determine whether more than or equal to a predetermined amount of time has passed since the garage door was opened; and at least one of:

deactivate the garage door system when more than or equal to the predetermined amount of time has passed since the garage door was opened and one or more of the number of occupants have not entered the garage, transmit, via the network access device, the one or more signals to the garage door transceiver to close the garage door when more than or equal to the predetermined amount of time has passed since the garage door was opened and the one or more of the number of occupants have not entered the garage, or transmit, via the network access device, a message to a user device indicating the garage door is open when more than or equal to the predetermined amount of time has passed since the garage door was opened and the one or more of the number of occupants have not entered the garage.

6. The system of claim 1, further comprising:

a user interface in communication with the ECU and configured to receive user input data indicating a command from a user to open the garage door; and wherein the ECU is further configured to transmit, via the network access device, the one or more signals to the garage door transceiver to open the garage door in response to receiving the user input data from the user interface.

7. The system of claim 6, wherein the ECU is further configured to:

determine whether more than or equal to a predetermined amount of time has passed since the garage door was opened; and at least one of:

deactivate the garage door system when more than or equal to the predetermined amount of time has passed since the garage door was opened and one or more of the number of occupants have not entered the garage, transmit, via the network access device, the one or more signals to the garage door transceiver to close the garage door when more than or equal to the predetermined amount of time has passed since the garage door was opened and the one or more of the number of occupants have not entered the garage, or transmit, via the network access device, a message to a user device indicating the garage door is open when more than or equal to the predetermined amount of time has passed since the garage door was opened and the one or more of the number of occupants have not entered the garage.

8. The system of claim 1, wherein the ECU is further configured to, after tracking the movement of each of the number of occupants:

identify, based on the tracked movement, when each of the number of occupants has crossed a threshold of the garage.

9. The system of claim 1, wherein the one or more occupant sensors include one or more of a camera, a lidar sensor, a radar sensor, a sonar sensor, a seatbelt sensor, and/or a pressure sensor.

10. An automatic garage door system for a vehicle, the system comprising:

one or more occupant sensors configured to detect or determine occupant data indicating a number of occupants within the vehicle;

one or more cameras configured to capture video data of a surrounding area of the vehicle, the surrounding area including a door of a house and a garage having a garage door and a garage door transceiver;

a network access device configured to communicate with the garage door transceiver to open and close the garage door; and an electronic control unit (ECU) electrically connected to the one or more occupant sensors, the one or more cameras, and the network access device and configured to:

receive the occupant data from the one or more occupant sensors and the video data from the one or more cameras;

track movement of each of the number of occupants in the surrounding area of the vehicle after the number of occupants exit the vehicle by processing or analyzing the received video data;

determine, based on the tracked movement, whether each of the number of occupants indicated by the occupant data have entered the garage through the garage door and/or the house through the door; and transmit, via the network access device, one or more signals to the garage door transceiver to close the garage door in response to a determination that all of the number of occupants indicated by the occupant data have entered the garage through the garage door and/or the house through the door.

11. The system of claim 10, wherein the ECU is further configured to:

determine whether the vehicle is parked outside of the garage based on the received video data; and wherein the ECU is configured to determine whether each of the number of occupants have entered the garage through the garage door and/or the house through the door based on the received video data in response to the determination that the vehicle is parked outside of the garage.

12. The system of claim 10, wherein the ECU is configured to transmit the one or more signals to the garage door transceiver to close the garage door in response to:

the determination that each of the number of occupants have entered the garage through the garage door and/or the house through the door; and determining that more than or equal to a predetermined amount of time has passed since each of the number of occupants have entered the garage through the garage door and/or the house through the door and/or that each of the number of occupants are at least a predetermined distance from a threshold of the garage.

13. The system of claim 10, further comprising:

a navigation unit in communication with the ECU and configured to indicate when the vehicle is within a predetermined distance of the garage; and wherein the ECU is further configured to transmit, via the network access device, the one or more signals to the garage door transceiver to open the garage door in response to receiving the indication from the navigation unit.

14. The system of claim 13, wherein the ECU is further configured to:

determine whether more than or equal to a predetermined amount of time has passed since the garage door was opened; and at least one of:

deactivate the garage door system when more than or equal to the predetermined amount of time has passed since the garage door was opened and one or more of the number of occupants have not entered the garage through the garage door and/or the house through the door, transmit, via the network access device, the one or more signals to the garage door transceiver to close the garage door when more than or equal to the predetermined amount of time has passed since the garage door was opened and the one or more of the number of occupants have not entered the garage through the garage door and/or the house through the door, or transmit, via the network access device, a message to a user device indicating the garage door is open when more than or equal to the predetermined amount of time has passed since the garage door was opened and the one or more of the number of occupants have not entered the garage through the garage door and/or the house through the door.

15. The system of claim 10, further comprising:

a user interface in communication with the ECU and configured to receive user input data indicating a command from a user to open the garage door; and wherein the ECU is further configured to transmit, via the network access device, the one or more signals to the garage door transceiver to open the garage door in response to receiving the user input data from the user interface.

16. The system of claim 15, wherein the ECU is further configured to:

determine whether more than or equal to a predetermined amount of time has passed since the garage door was opened; and at least one of:

deactivate the garage door system when more than or equal to the predetermined amount of time has passed since the garage door was opened and one or more of the number of occupants have not entered the garage through the garage door and/or the house through the door, transmit, via the network access device, the one or more signals to the garage door transceiver to close the garage door when more than or equal to the predetermined amount of time has passed since the garage door was opened and the one or more of the number of occupants have not entered the garage through the garage door and/or the house through the door, or transmit, via the network access device, a message to a user device indicating the garage door is open when more than or equal to the predetermined amount of time has passed since the garage door was opened and the one or more of the number of occupants have not entered the garage through the garage door and/or the house through the door.

17. The system of claim 10, wherein the ECU is further configured to, after tracking the movement of each of the number of occupants:

identify, based on the tracked movement, when each of the number of occupants has crossed a threshold of the garage or a threshold of the house.

18. A method for automatically controlling a garage door of a garage having a garage door transceiver, the method comprising:

detecting or determining, via one or more occupant sensors, occupant data indicating a number of occupants within a vehicle;

capturing, via one or more cameras, video data of a surrounding area of the vehicle, the surrounding area including the garage, tracking, via an electronic control device (ECU) electrically connected to the one or more occupant sensors and the one or more cameras, movement of each of the number of occupants in the surrounding area of the vehicle after the number of occupants exit the vehicle by processing or analyzing the video data;

determining, based on the tracked movement, whether each of the number of occupants indicated by the occupant data have entered the garage; and transmitting, via a network access device electrically connected to the ECU, one or more signals to the garage door transceiver to close the garage door in response to a determination that all of the number of occupants indicated by the occupant data have entered the garage.

19. The method of claim 18, further comprising:

determining, via the ECU, whether the vehicle is parked outside of the garage based on the video data; and wherein the tracking movement of each of the number of occupants in the surrounding area of the vehicle is in response to the determination that the vehicle is parked outside of the garage.

20. The method of claim 18, wherein the transmitting the one or more signals to the garage door transceiver to close the garage door is in response to:

the determination that all of the number of occupants indicated by the occupant data have entered the garage; and determining, via the ECU, that more than or equal to a predetermined amount of time has passed since each of the number of occupants have entered the garage and/or that each of the number of occupants are at least a predetermined distance from a threshold of the garage.

* * * * *